(12) United States Patent
Fawson

(10) Patent No.: US 6,706,303 B2
(45) Date of Patent: Mar. 16, 2004

(54) DUTCH OVEN DISPOSABLE LINER

(76) Inventor: Roxanne Fawson, 687 Country Club Dr., Stansbury Park, UT (US) 84074

( * ) Notice: Subject to any disclaimer, the term of this patent is extended or adjusted under 35 U.S.C. 154(b) by 0 days.

(21) Appl. No.: 09/828,560

(22) Filed: Apr. 6, 2001

(65) Prior Publication Data

US 2002/0144605 A1 Oct. 10, 2002

(51) Int. Cl.[7] ................................................. A47J 36/16
(52) U.S. Cl. ........................... 426/523; 99/426; 99/449; 220/373.2; 220/573.4; 220/912
(58) Field of Search ........................... 99/426, 447, 449; 426/523, 113, 115; 220/573.1–573.5, 912

(56) References Cited

U.S. PATENT DOCUMENTS

| 607,631 | A | * | 7/1898 | Staley |
| 751,640 | A | * | 2/1904 | Hayes |
| 949,453 | A | * | 2/1910 | Steger |
| 1,152,308 | A | * | 8/1915 | Evans |
| 1,323,473 | A | * | 12/1919 | Hettinger |
| 3,724,711 | A | * | 4/1973 | George et al. ............ 220/63 R |
| 3,934,748 | A | * | 1/1976 | Racz ............................ 220/9 R |
| 4,164,174 | A | * | 8/1979 | Wallsten ....................... 99/415 |
| 4,320,699 | A | * | 3/1982 | Binks ........................... 99/349 |
| 4,401,017 | A | * | 8/1983 | Feld .............................. 99/413 |
| 4,434,197 | A | | 2/1984 | Petriello et al. |
| 4,903,683 | A | | 2/1990 | Larsen et al. |
| 4,909,411 | A | | 3/1990 | Uchida et al. |
| 5,038,009 | A | | 8/1991 | Babbitt |
| 5,133,333 | A | | 7/1992 | Stout |
| 5,251,542 | A | * | 10/1993 | Itoh et al. ...................... 99/403 |
| 5,314,220 | A | | 5/1994 | Clement |
| 5,447,097 | A | | 9/1995 | Rhee |
| 5,836,295 | A | | 11/1998 | Faraj |
| 5,992,307 | A | | 11/1999 | Parker et al. |
| 6,055,901 | A | * | 5/2000 | Gantos et al. ................. 99/412 |
| 6,076,451 | A | | 6/2000 | Studer |
| 6,313,446 | B1 | * | 11/2001 | Jones ........................... 219/433 |
| 6,457,601 | B1 | * | 10/2002 | Chappell .................. 220/573.4 |
| 2002/0079316 | A1 | * | 6/2002 | Greenfield et al. ....... 220/573.4 |

FOREIGN PATENT DOCUMENTS

GB        2221143 A * 1/1990

OTHER PUBLICATIONS

Jonathan Norton Leonard; American Cooking: The Great West, 1971, Time–Life Books, NY, pp. 116–119 & 162–165.*

* cited by examiner

Primary Examiner—Drew Becker
(74) Attorney, Agent, or Firm—Thorpe North & Western, LLP

(57) ABSTRACT

An apparatus and method for using a disposable liner for cooking in a cooking vessel such as a dutch oven. The disposable liner includes a liner and one or more handles at an upper portion of the liner. The liner includes a bottom wall and an upstanding side wall. The one or more handles are made to extend from the upper portion of the liner, wherein the handles are movable. With this arrangement, the disposable liner is configured and shaped to fit in a cooking vessel, where the handles are movable downward so that a cooking vessel's lid may sit flat thereon without interference from the handles.

22 Claims, 6 Drawing Sheets

DUTCH OVEN DISPOSABLE LINER

BACKGROUND OF THE INVENTION

1. Field of the Invention

The present invention relates generally to an apparatus and method for cooking with a dutch oven. More particularly, the present invention relates to a dutch oven disposable liner and a method for using the same.

2. Background

Dutch oven cooking is a well-known method of cooking, which is usually employed in a camping or barbeque atmosphere. Dutch ovens are made of cast iron, one of the oldest known metals used in the manufacture of cookware and, currently, the metal of choice among chefs worldwide. Cast iron provides durability, heat retention, and even heat distribution, preventing "hot spots" and enabling temperature control of the cookware.

Cast iron cookware provides the best results after a "seasoning process" that often times may need repeating. The seasoning process includes applying oil to the cast iron's surface and baking the oiled cookware in the oven for about an hour. This seasoning process allows oil to be absorbed into the cast iron's surface and creates a non-stick rustproof finish. After such a seasoning process, if the cast iron gets rust spots or the food begins to taste slightly metallic, the cookware is cleaned thoroughly in hot water and then undergoes the seasoning process once again. Having to undergo such re-seasoning may often be untimely and time consuming, especially while in the process of undergoing a cooking project.

Other challenges in dutch oven cooking include the inability to cook deserts or a second course in the dutch oven immediately after cooking a main course. This sequence of cooking in a dutch oven is awkward and tiresome, since the dutch oven should be cleaned out immediately after serving the main course while it's still hot. The cleaning sequence is even more difficult while in a camping atmosphere, rather than in a home barbequing atmosphere, although it is still difficult while barbequing.

Therefore, it would be advantageous to provide a method and apparatus that allows dutch oven users to cook in their dutch ovens when the cookware needs re-seasoning without having to immediately undergo the re-seasoning process. It would also be advantageous to provide a method and apparatus that overcomes the sequencing challenges of needing to cook successive courses within the same dutch oven in a given meal.

SUMMARY OF THE INVENTION

The present invention is directed to a disposable liner for a cooking vessel such as a dutch oven. The disposable liner includes a liner and at least one handle. The liner is preferably made of an aluminum or an alloy thereof. The liner includes a bottom wall that extends radially to an upstanding side wall. The upstanding side wall includes an upper portion, from which the at least one handle extends. With this arrangement, the disposable liner is configured and shaped to fit within a cooking vessel, such as a dutch oven.

In one aspect of the invention, the liner includes a frame structure. The frame structure is made to support the liner from tearing and/or deforming when the disposable liner is weighted down with, for example, food. The frame structure includes one or more ring supports that extend in intervals radially around the upstanding side wall and/or the bottom wall. Also, linear supports extend from an upper portion of the liner along the upstanding side wall to the bottom wall.

The ring supports may be one or more wire rings positioned proximate an upper portion of the liner, a middle portion of the liner and/or a bottom portion of the liner. The linear supports may extend along the bottom wall and extend upward to opposing sides of the upper portion of the liner. The liner may also include one or more linear supports that extend along the bottom wall in a substantially symmetrical manner, wherein each extends upwardly to opposing sides of the liner. The linear supports and/or the ring supports may each be substantially continuous extensions or continuous interconnections to distribute a load throughout the disposable liner.

In another aspect of the invention, the handle is a continuous extension extending from the upper portion of the liner. The handle may be a ductile or a flexible extension from the liner itself and/or the frame structure so that when placing the disposable liner in the cooking vessel the at least one handle may be bendable or maneuverable to provide room for the cooking vessel's lid to fit thereon.

In another aspect of the invention, the handle is slidably interconnected with the upper portion of the liner. The handle may be slidably interconnected with the liner and/or the frame structure.

In still another aspect of the invention, the handle is collapsibly interconnected with the upper portion of the liner. The handle may be collapsibly interconnected with the liner and/or the frame structure.

In another aspect of the invention, the handle is insertably interconnected with the upper portion of the liner. The at least one handle may be insertably interconnected with the liner and/or the frame structure.

With the handle having at least one of a bendable continuous connection, a slidable interconnection, a collapsible interconnection, and an insertable interconnection with the upper portion of the disposable liner, the disposable liner fits within the cooking vessel while allowing the lid to sit thereon without interfering with the handle. In addition, the one handle provides easy removal of the disposable liner from the cooking vessel after cooking.

Other features and advantages of the present invention will become apparent to those of skill in the art through a consideration of the ensuing description, the accompanying drawings and the appended claims.

BRIEF DESCRIPTION OF THE SEVERAL VIEWS OF THE DRAWINGS

While the specification concludes with the claims particularly pointing out and distinctly claiming that which is regarded as the present invention, the advantages of this invention may be ascertained from the following description of the invention when read in conjunction with the accompanying drawings, in which:

DETAILED DESCRIPTION OF THE INVENTION

Preferred embodiments of the present invention will be hereinafter described with reference to the accompanying drawings. It should be understood that the illustrations are not meant to be actual views of any particular apparatus and/or method, but are merely idealized representations which are employed to more clearly and fully depict the present invention that would otherwise be possible. Additionally, elements and features common between the figures retain the same numerical designation.

Figure 1:
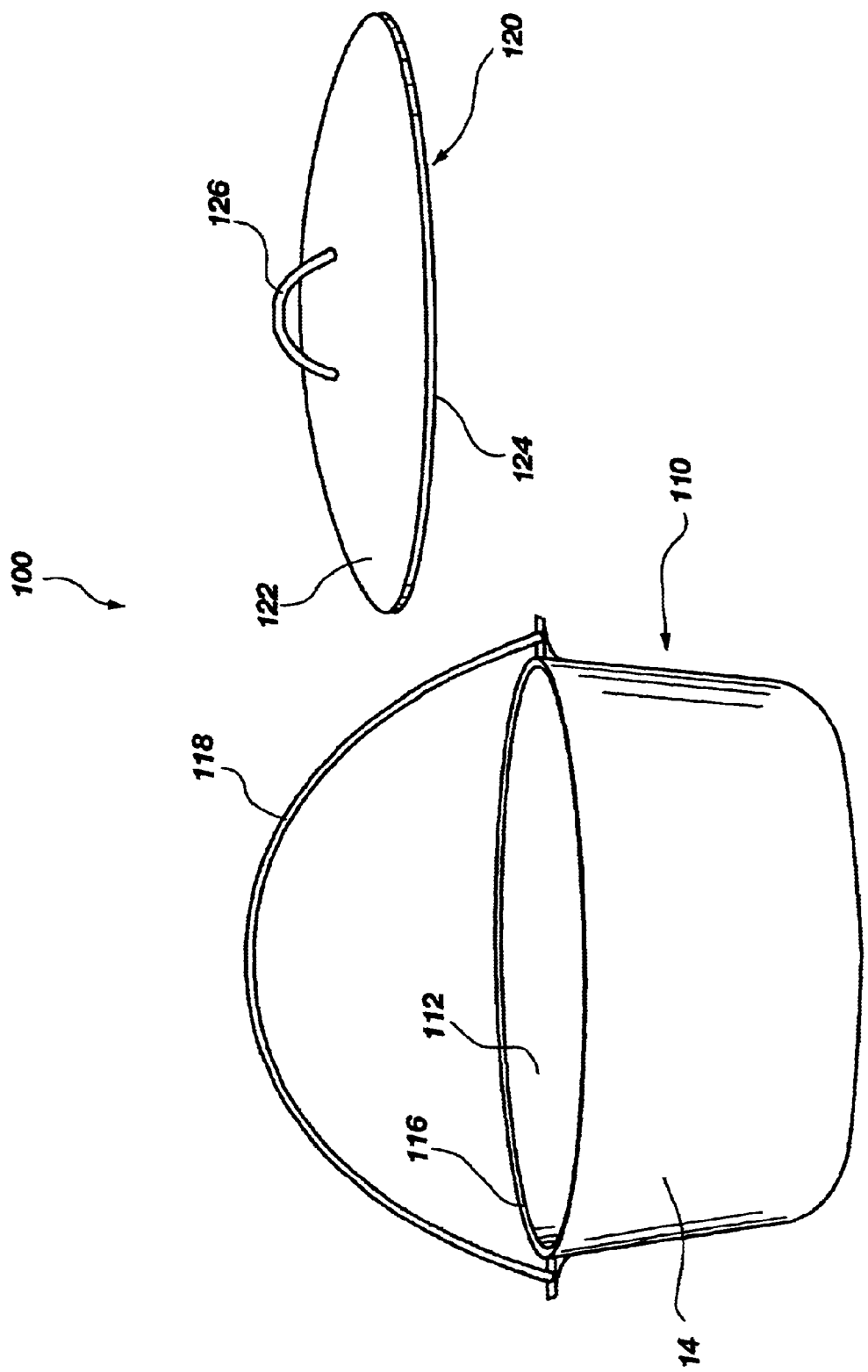
FIG. 1 is a simplified perspective view of a conventional cooking vessel, such as a dutch oven, having a basin, a handle and a lid.

Referring to FIG. 1, there is depicted a simplified perspective view of a conventional cooking vessel 100. The cooking vessel 100, is typically made of cast iron, but is not limited thereto, and is generally known as a "dutch oven". The cooking vessel 100 generally includes a basin 110 with a basin handle 118 extending from opposite sides thereof and a lid 120 having a lid handle 126 extending from a top surface 122 of the lid 120. The basin 110 includes an interior surface 112, and an exterior surface 114 and a ridge 116 at an upper basin portion between the exterior and the interior surfaces 114 and 112. The lid 120 is generally configured to fit and rest on the ridge 116 of the basin 110 so that a bottom surface 124 of the lid 120 abuts against the ridge 116 of the basin 110. The lid 120 typically includes a lid handle 126.

Figure 3:
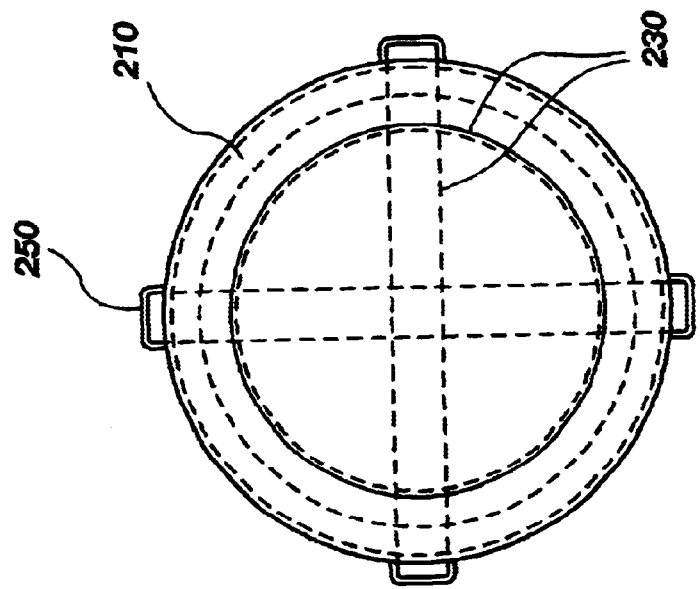
FIG. 3 is a simplified top view of a disposable liner according to the present invention.
Figure 2:
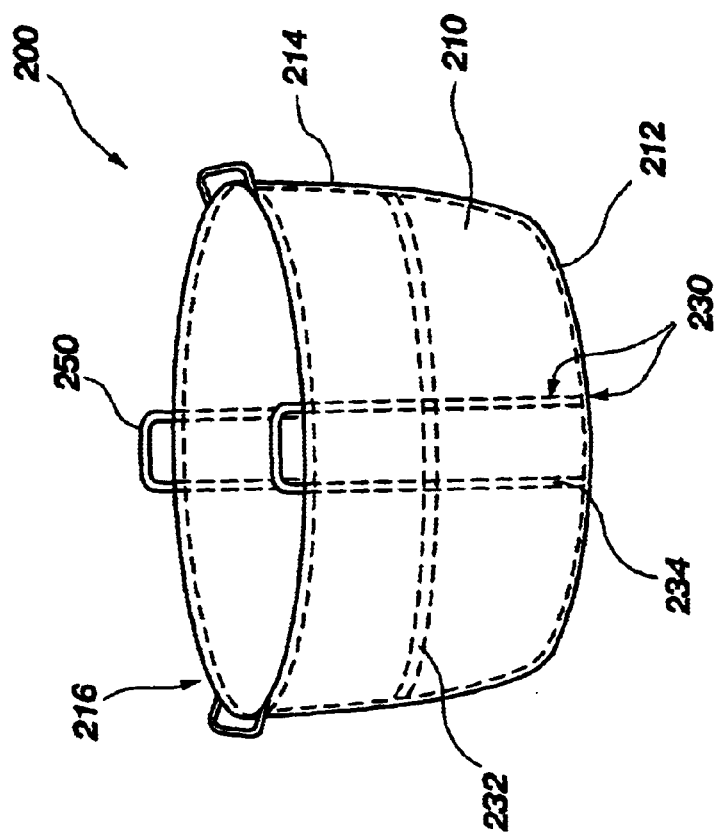
FIG. 2 is a simplified perspective view of a disposable liner according to the present invention.

Turning to FIGS. 2 and 3, there is depicted a simplified perspective view and a top view, respectively, of a disposable liner 200 according to the present invention. The disposable liner 200 includes a liner 210 and one or more handles 250 which are extendable from an upper portion 216 of the disposable liner 200. The liner 210 includes a bottom wall 212 which is substantially circular from which an upstanding sidewall 214 extends upward from the bottom wall 212. The liner 210 may be, but is not limited to, an aluminum material and/or an alloy thereof. Further, the liner 210 may be formed with one or more layers. As such, the liner 210 may be thin enough to be deformable and conformable to the cooking vessel, but have enough strength to carry approximately twenty pounds without the liner 210 tearing. The aluminum material and/or alloy thereof is preferred because of its conductive characteristics. Thus, as the disposable liner 200 sits in the evenly-heat dispersed, cast iron cooking vessel, the liner 210 will effectively draw the heat from the cast iron to heat the food therein.

The handles 250 are extendable from an upper portion 216 of the upstanding sidewall 214. Preferably, the one or more handles 250 are formed so that they are movable and/or bendable. Further, it is preferred that the one or more handles 250 are formed to include an inverted U-shape which extends or is extendable from the upper portion 216 of the upstanding sidewall 214. However, the one or more handles 250 may be formed in any shape or manner that allows the disposable liner 200 to be easily removed from the cooking vessel 100 and/or easily moved from one location to another when weighted down with food. The one or more handles 250 may be, but is not limited to, an aluminum material or an alloy thereof.

The disposable liner 200 may also include a frame structure 230. The frame structure 230 may include ring supports 232 and linear supports 234 which extend along the upstanding sidewall 214 and the bottom wall 212 to give the disposable liner 200 an improved support system. However, the frame structure 230 is not limited to a particular frame configuration so long as it provides the added support necessary for utilizing the disposable liner 200.

In the frame structure, ring supports 232 may be provided at intervals along the upstanding sidewall 214. In particular, the preferred placement of the ring supports 232 may be provided at a bottom portion where the bottom wall 212 and the upstanding side wall 214 converge, at a substantially middle portion of the upstanding side wall 214, and/or at the upper portion 216 of the upstanding sidewall 214. The ring supports 232 may also be provided along the bottom wall 212 of the liner 210 (not shown). Further, linear supports 234 may be provided to extend along the bottom wall and up opposing sides of the upstanding side wall 214 to opposing handles 250. It is preferred that the linear supports 234 be interconnected with the one or more handles 250 to provide added strength to the disposable liner 200. It is also preferred, but not limited to, the ring supports 232 being interconnected with the linear supports 234. Such interconnection of the one or more handles 250 to the linear supports 234 and, further, to the ring supports 232 distributes the loading throughout the frame structure 230. This distributed loading provides added strength to the disposable liner 250 and its ability to handle heavy loads from the one or more handles 250.

The frame structure is preferably an aluminum material or an alloy thereof. The frame structure may be a wire-type material or simply the liner 210 itself with thicker portions therein which effectively act as the frame structure 230. In the wire-type construction, the frame structure 230 is preferably provided between layers of the liner 210 or on the inside of the liner 210. With the frame structure 230 on the inside of the liner 210, the frame structure 230 may be bonded to the liner 210 to provide support thereto 210. The frame structure may also be provided on the outside of the liner 210, however, this construction may minimize the amount of contact the liner 210 has with the interior surface 112 of the basin 110, thereby, preventing optimal heat conduction from the basin 110 while cooking. On the other hand, providing the frame structure 230 on the outside of the liner 210 may be preferred as it will easily support the liner 210 with little or no bonds thereto.

Figure 4:
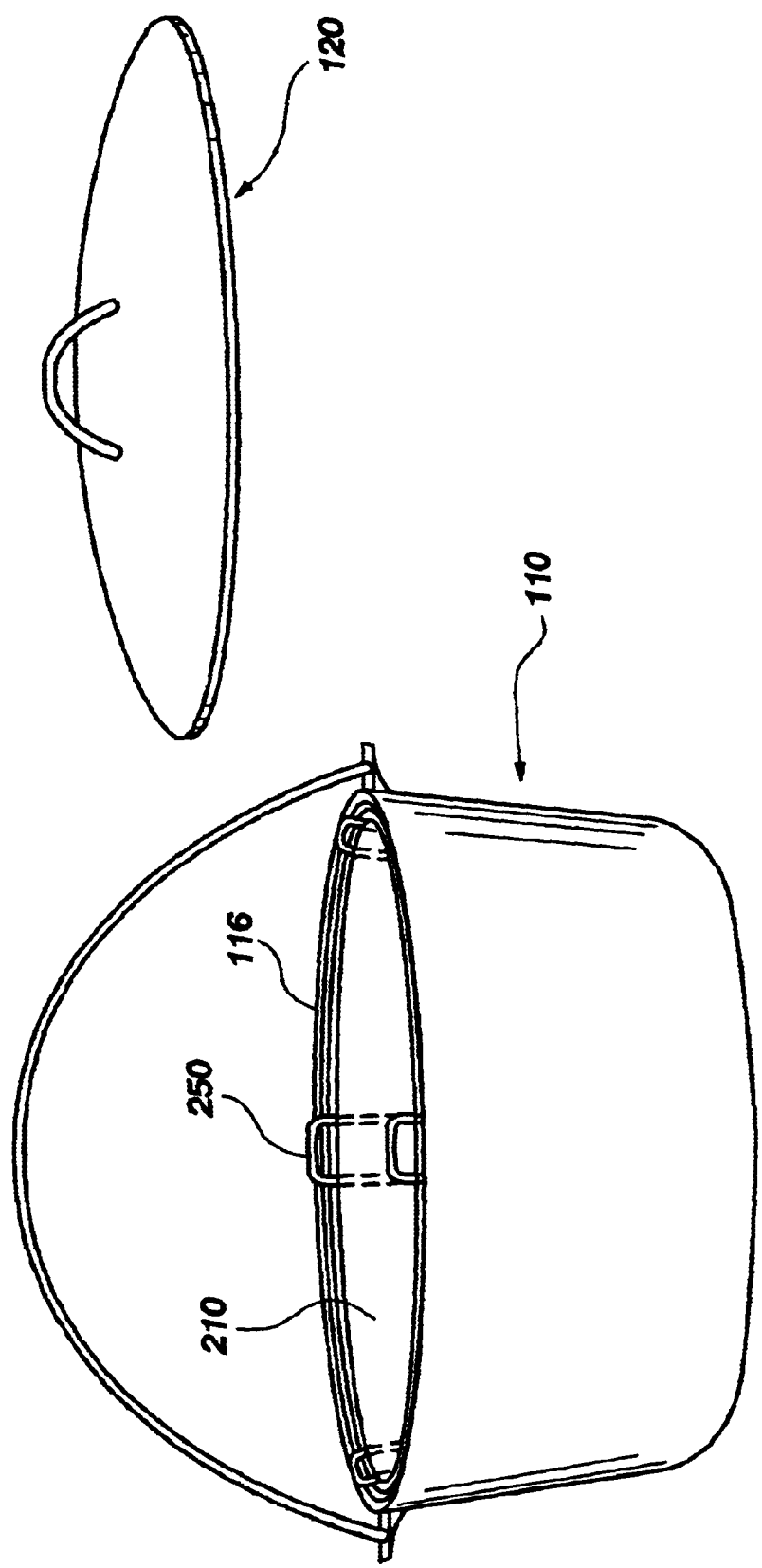
FIG. 4 is a simplified perspective view of a conventional cooking vessel having a disposable liner therein according to the present invention.

As shown in FIG. 4, the bottom wall 212 and upstanding sidewall 214 of the disposable liner 200 are formed and shaped such that the disposable liner 200 may rest within the interior surface 112 of the basin 110 in an abutting manner. As depicted, the one or more handles 250 may extend above the ridge 116 of the basin 110, which would prevent the lid 120 from sitting flat on the ridge 116. Therefore, according to the present invention, the one or more handles 250 are maneuverable such that the lid 120 fits flat on the ridge 116 of the basin 110.

Figure 6:
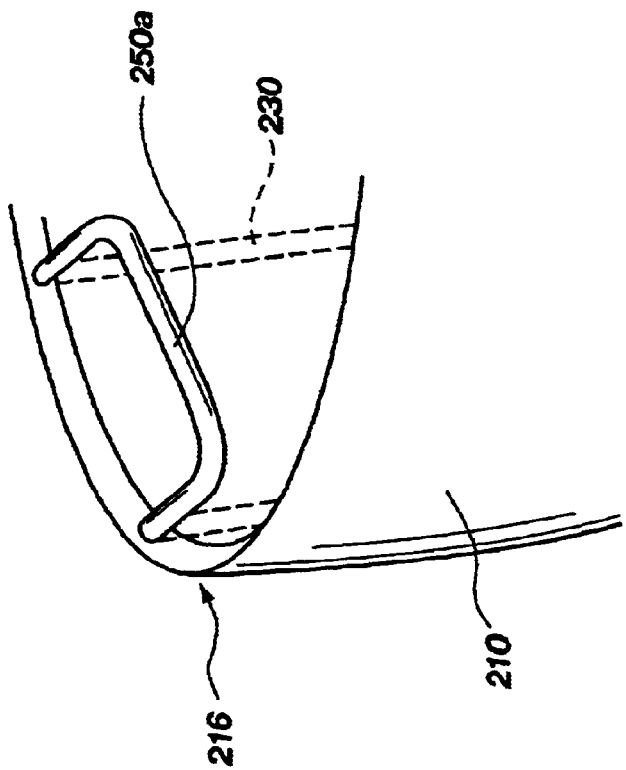
FIG. 6 is a simplified partial perspective view of a first embodiment of a disposable liner with a handle having a continuous connection to an upper portion of the disposable liner in a second position according to the present invention.
Figure 5:
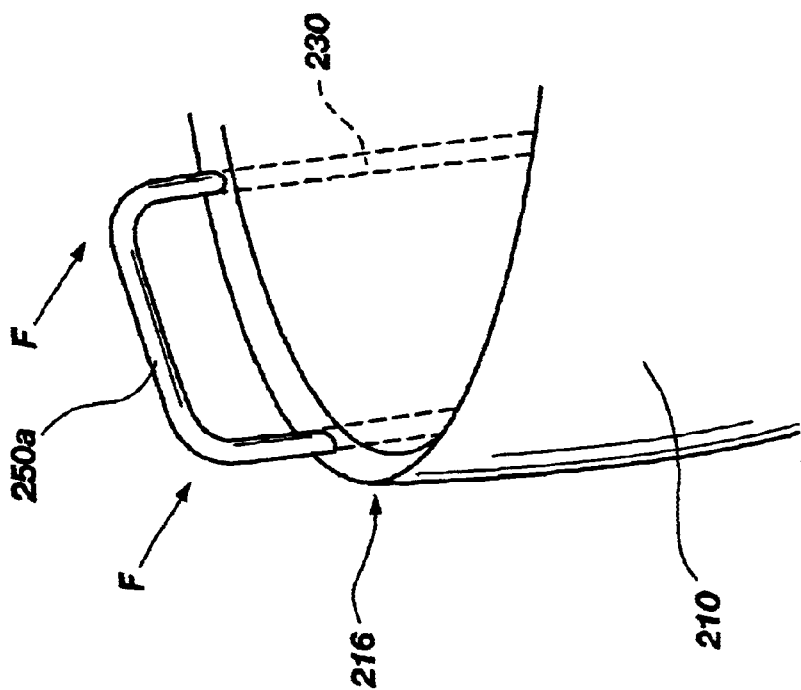
FIG. 5 is simplified partial perspective view of a first embodiment of a disposable liner with a handle having a continuous connection to an upper portion of the disposable liner in a first position according to the present invention.

FIGS. 5 and 6 depict a first embodiment in which the one or more handles 250(a) may be maneuvered into a position such that they will not obstruct the lid from sitting flat on the basin 110. As shown in FIG. 5, the handle 250(a) is in a first position which extends substantially upward from the upper portion 216 of the liner 210. In this embodiment, the handle 250(a) is a continuous extension of the upper portion of the disposable liner 210 and, more particularly, the handle 250(a) may be a direct continuation of the linear supports 234 of the frame structure 230 (shown with dashed lines). In the case that there is no frame structure, the handle 250(a) may be a continuous extension of the liner 210.

In FIG. 6, the handle 250(a) is shown in a second position. The handle 250(a) is movable to the second position by manually applying a force F to the handle 250(a) in a radially downward direction. The handle 250(a) is made of a malleable, ductile or a flexible material. As such, the handle 250(a) is preferably made of, but is not limited to, an aluminum material and/or an alloy thereof and is a particular thickness so that the handle 250(a) may be bendable in the radially downward direction with ease. Such particular thickness of the handle 250(a) may be determined by one of ordinary skill in the art. Thus, in the first embodiment, the one or more handles 250(a) are fixed extensions of the frame structure 230 and/or the liner 210 that may be maneuvered downward to, thereby, allow the lid 120 to fit flat on the ridge 116 of the basin 110.

Figure 8:
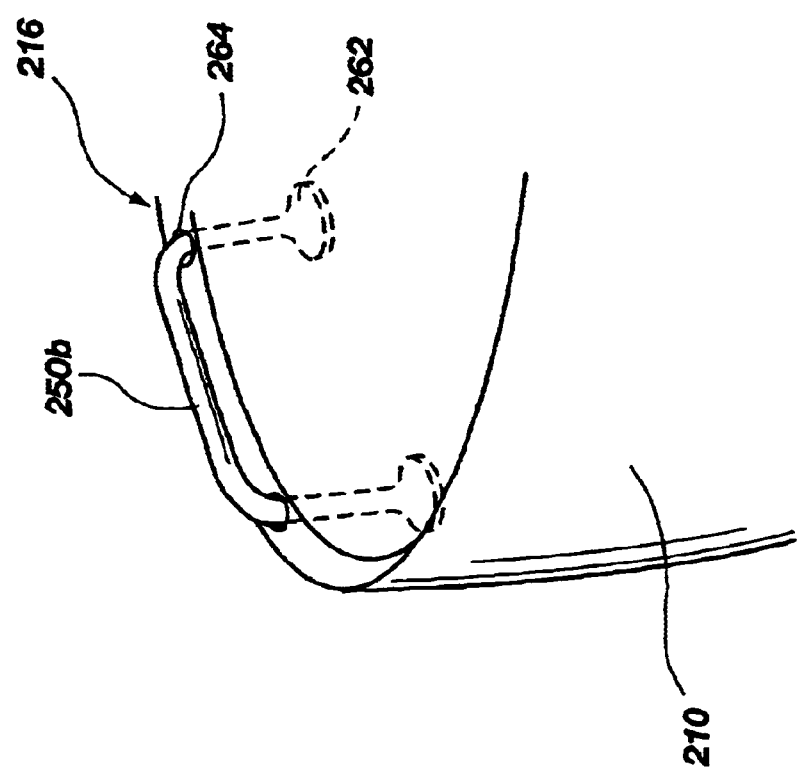
FIG. 8 is a simplified partial perspective view of a second embodiment of a disposable liner with a handle having a slidable interconnection, a collapsible interconnection and/or an insertable interconnection to an upper portion of the disposable liner in a second position according to the present invention.
Figure 7:
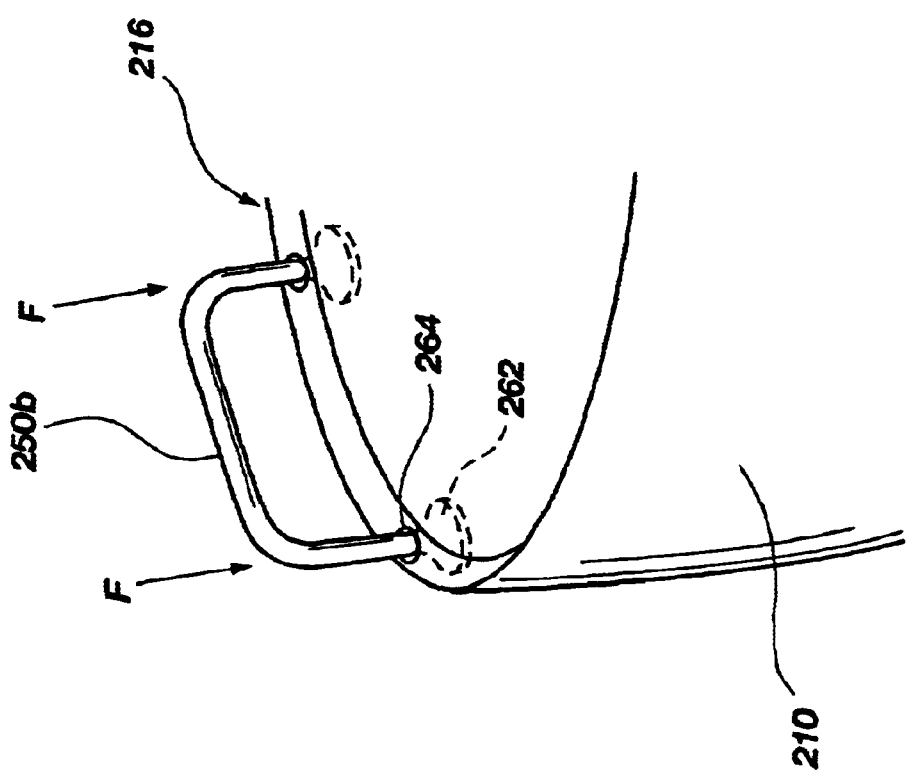
FIG. 7 is a simplified partial perspective view of a second embodiment of a disposable liner with a handle having a slidable interconnection, a collapsible interconnection and/or an insertable interconnection to an upper portion of the disposable liner in a first position according to the present invention.

Referring to FIGS. 7 and 8, a second embodiment is shown with a movable handle 250(b). In the second embodiment, the handle 250(b) is U-shaped with enlarged ends 262, which are interconnected with the upper portion 216 of the liner 210 through openings 264 therein. The openings 264 are sized such that they catch the handle 250(b) at the enlarged ends 262 when the handle is in the first position, as shown in FIG. 7. In order to prevent the handles 250(b) from interfering with the lid 120 sitting on the ridge 116 of the basin 110, the handle 250(b) may be moved downward by applying a force F in the second position, shown in FIG. 8. In the second position, the handle 250(b) is pushed to be substantially flush with the upper portion of the liner 210. In this manner, the handle 250(b) may be said to be slidably interconnected, collapsibly interconnected, and/or insertably interconnected with the upper portion 216 of the liner 210.

Figure 10:
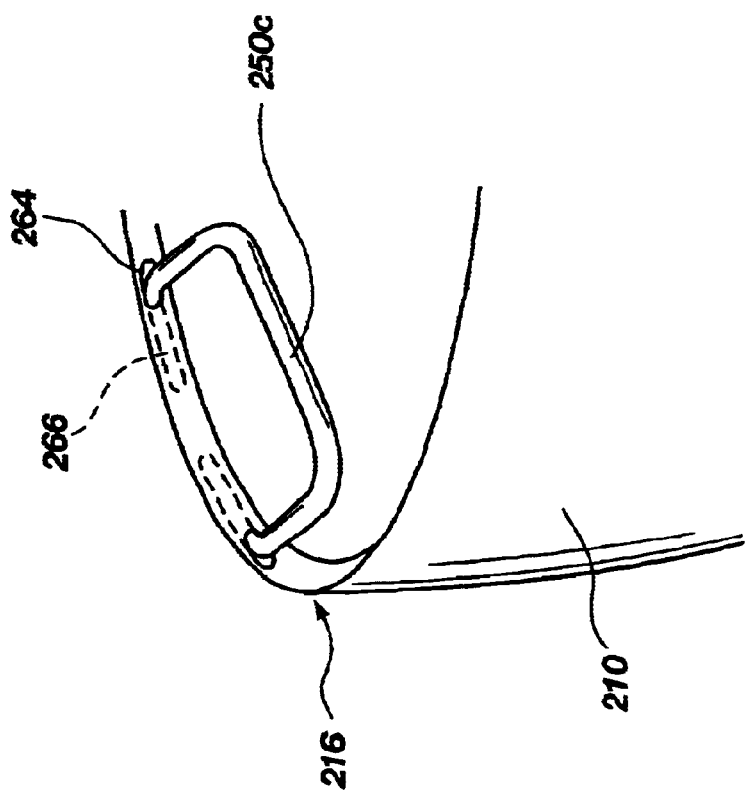
FIG. 10 is a simplified partial perspective view of a third embodiment disposable liner with a handle having a slidable interconnection, a collapsible interconnection, and/or an insertable interconnection to an upper portion of the disposable liner in a second position according to the present invention.
Figure 9:
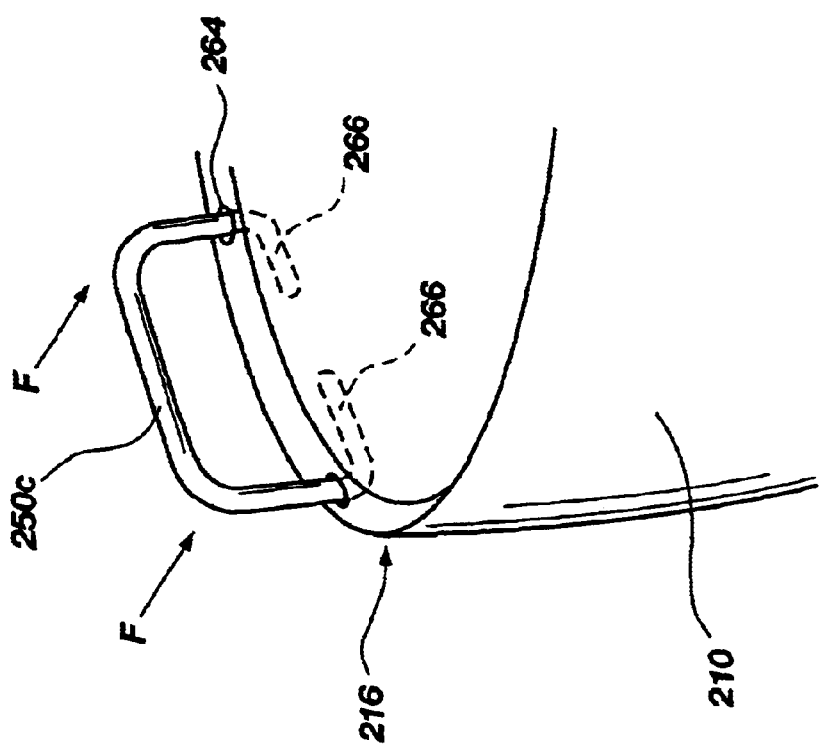
FIG. 9 is a simplified partial perspective view of a third embodiment of a disposable liner with a handle having a slidable interconnection, a collapsible interconnection and an insertable interconnection to an upper portion of the disposable liner in a first position according to the present invention.

In FIGS. 9 and 10, a third embodiment is depicted with a movable handle 250(c). In the third embodiment, the handle 250(c) is C-shaped, wherein ends 266 of the C-shaped handle 250(c) are hooked through openings 264 in the upper portion 216 of the liner 210. As in the previous embodiments, the handle 250(c) may be placed in an upward first position and also rotated inwardly by a manual force F to a second position, as shown in FIGS. 9 and 10, respectively. By this arrangement, the C-shaped handle 250(c) of the third embodiment provides an interconnection with the upper portion 216 of the liner 210 in each of a slidable, collapsible, and insertable type manner. As such, the C-shaped handle 250(c) may be rotatably maneuvered to the second position to allow the lid 120 to sit flat on the basin 110.

While the present invention has been disclosed in terms of a certain preferred embodiments and alternatives thereof, those of ordinary skill in the art will recognize and appreciate that the invention is not so limited. Additions, deletions and modifications to the disclosed embodiments may be effected without departing from the scope of the invention as claimed herein. Similarly, features from one embodiment may be combined with those of another while remaining within the scope of the invention.

What is claimed is:

1. A disposable liner member for a dutch oven comprising:
   a liner having a bottom wall with a circular periphery and an upstanding side wall with an upper portion being circular defining a diameter, said liner having a liquid-retaining surface extending along said bottom wall to at least said upper portion of said upstanding side wall, said bottom wall and said upstanding side wall of said liner configured with a deformable material to comformably and abuttingly fit against an inner surface of the dutch oven; and
   a plurality of handles directly attached to opposite sides of said upper portion of said liner, each of said plurality of handles being extendable from said upper portion of said liner and configured to be moveable with respect to said upper portion for completely enclosing in the dutch oven, each of said plurality of handles having a generally U-shaped configuration with two points of direct attachment to the liner, the two points of attachment expanding along said upper portion a distance substantially less than the diameter of the upper portion of the liner.

2. The disposable liner member of claim 1, wherein said liner comprises a frame structure configured to support said liner.

3. The disposable liner member of claim 2, wherein said frame structure comprises at least one linear structure.

4. The disposable liner member of claim 2, wherein said frame structure comprises at least one support structure extending from an upper portion of said liner along said upstanding side wall and said bottom wall.

5. The disposable liner member of claim 4, wherein said frame structure further comprises at least one ring structure extending along said upstanding side wall and interconnecting with said at least one support structure extending from said upper portion of said liner.

6. The disposable liner member of claim 5, wherein said at least one ring structure is provided along at least one of a bottom portion, a middle portion and said upper portion of said upstanding side wall of said liner.

7. The disposable liner member of claim 2, wherein said frame structure interconnects with said plurality of handles.

8. The disposable liner member of claim 7, wherein said plurality of handles integrally extend from said frame structure.

9. The disposable liner member of claim 8, wherein said plurality of handles are bendable.

10. The disposable liner member of claim 7, wherein said plurality of handles are slidably interconnected with said frame structure.

11. The disposable liner member of claim 1, wherein said plurality of handles slideably interconnect with said upper portion of said liner.

12. The disposable liner member of claim 1, wherein said plurality of handles collapsibly interconnect with said upper portion of said liner.

13. The disposable liner member of claim 1, wherein said plurality of handles insertably interconnect with said upper portion of said liner.

14. The disposable liner member of claim 1, wherein said plurality of handles are integrally interconnected with said upper portion of said liner.

15. The disposable liner member of claim 14, wherein said plurality of handles are bendable.

16. The disposable liner member of claim 2, wherein said liner is rigidly bonded to said frame structure.

17. The disposable liner member of claim 2, wherein said liner comprises at least a first layer and at least a second layer with said frame structure therebetween.

18. The disposable liner member of claim 2, wherein said liner comprises at least one layer interconnectedly adjacent said frame structure.

19. The disposable liner member of claim 1, wherein said liner and said handles comprise at least one of an aluminum material and an aluminum alloy material.

20. A method of fabricating a disposable liner member for a dutch oven, the method comprising:

forming a liner with a deformable material having a bottom wall with a circular periphery and an upstanding side wall with an upper portion being circular defining a diameter so that said bottom wall radially and said upstanding side wall of said liner is configured to comfortably and abuttingly fit against an inner surface of the dutch oven, said liner having a liquid-retaining surface extending along said bottom wall to at least said upper portion of said upstanding side wall;

forming a plurality of handles directly attached to opposite sides of said upper portion of said liner so that each of said plurality of handles are extendable from said upper portion of said liner and configured to be moveable with respect to said upper portion for completely enclosing said liner and said plurality of handles in the dutch oven; and configuring each of said plurality of handles with a generally U-shaped configuration with two points of direct attachment to the liner so that the two points of attachment expand along said upper portion a distance substantially less than the diameter of the upper portion of the liner.

21. A method of cooking with a disposable liner member, the method comprising:

providing a dutch oven having an inner surface, an outer surface and an upper ridge between said inner surface and said outer surface, and a lid made for resting on said upper ridge;

providing a disposable liner having a bottom wall with a circular periphery extending to an upstanding side wall, said upstanding sidewall having an upper portion being circular defining a diameter, said disposable liner having a deformable material and a liquid-retaining surface extending along said bottom wall to at least said upper portion of said upstanding side wall, said upper portion having a plurality of handles directly attached to opposite sides of said upper portion and extendable from said upper portion and configured to be moveable with respect to said upper portion, each of said plurality of handles having a generally U-shaped configuration with two points of direct attachment to the liner, the two points of attachment expanding along said upper portion a distance substantially less than the diameter of the upper portion of the liner;

disposing said disposable liner so that said bottom wall and said upstanding side wall substantially conforms and abuts with said inner surface of said dutch oven;

providing food in said disposable liner;

maneuvering said plurality of handles to a downward position below said upper ridge of said dutch oven for completely enclosing in said dutch oven;

placing said lid of said dutch oven on said ridge;

placing said dutch oven with said disposable liner therein to a hot surface to thereby cook said food therein;

removing said dutch oven from said hot surface and removing said lid from said dutch oven;

maneuvering at least some of said plurality of handles to an upward position; and removing said disposable liner from said dutch oven by said plurality of handles in said upward position.

22. A disposable liner member in combination with a cooking vessel, the combination comprising:

a basin including an inner surface and an upper ridge, said basin configured to receive a basin lid to sit on said upper ridge of said basin;

a liner having a bottom wall with a circular periphery and an upstanding side wall with an upper portion being circular defining a diameter, said liner having a liquid-retaining surface extending along said bottom least said upper portion of said upstanding side wall, said bottom wall and said upstanding side wall of said liner configured with a deformable material to comfortably and abuttingly sit against said inner surface of said basin; and a plurality of handles directly attached to opposite sides of said upper portion of said liner, each of said plurality of handles being extendable from said upper portion of said liner, said plurality of handles configured to be maneuverable so that said basin lid sits flat on said upper ridge of said basin without interference, each of said plurality of handles having a generally U-shaped configuration with two points of direct attachment to the liner, the two points of attachment expanding along said upper portion a distance substantially less than the diameter of the upper portion of the liner.

* * * * *